March 21, 1961 N. STEFAN 2,976,021
UNIVERSAL ANGLE COUPLING
Filed Nov. 20, 1958
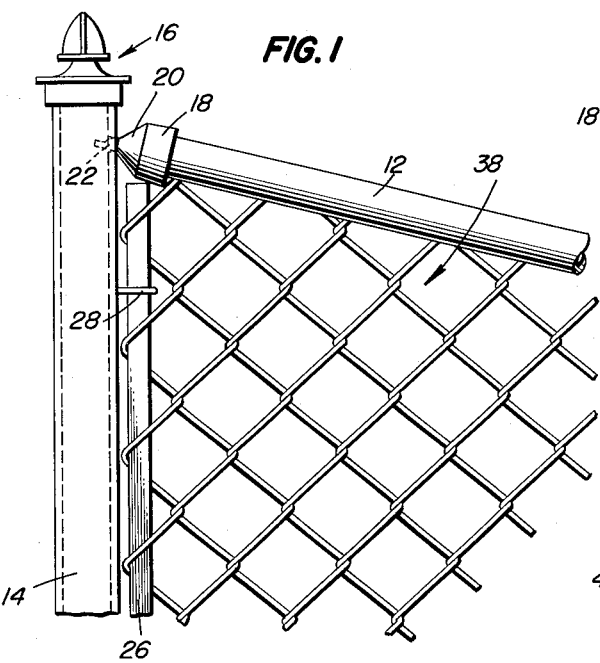
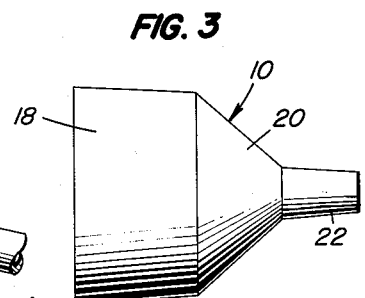
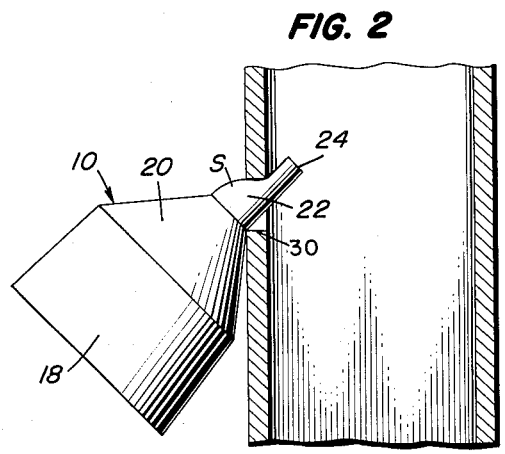
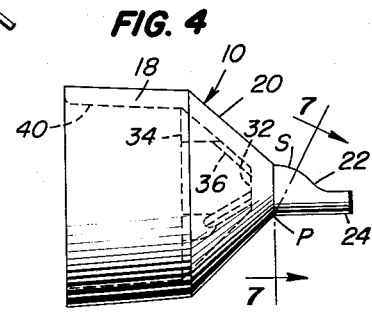
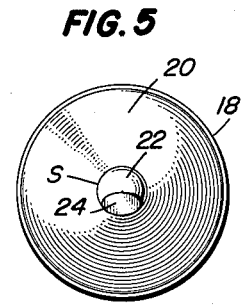
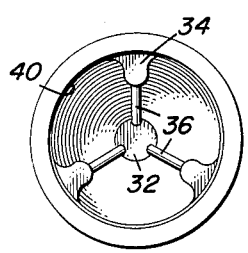
INVENTOR
Nicholas Stefan
BY Walter G. Finch
ATTORNEY

United States Patent Office 2,976,021
Patented Mar. 21, 1961

2,976,021

UNIVERSAL ANGLE COUPLING

Nicholas Stefan, Baltimore, Md., assignor to Anchor Post Products, Inc., Baltimore, Md., a corporation of New Jersey Filed Nov. 20, 1958, Ser. No. 775,154

10 Claims. (Cl. 256—65)

This invention relates generally to rod end couplings, and more particularly it pertains to universal angle couplings or top rail or brace rail fittings coupling fence rails to fence posts.

Bands and bolts, together with other miscellaneous fittings have been used in the past to join fence top rails and brace rails to posts, but they are generally large and awkward in appearance, expensive to make, and lack flexibility.

It is an object of this invention to provide a simple universal angle coupling for fence structure which has a minimum of parts and which is strong and presents an attractive finished appearance.

Another object of this invention is to provide a universal angle coupling for use as a connection between rails of a fence and a fence post.

Still another object of this invention is to provide a universal angle coupling which can be utilized for rapidly coupling a top rail to a fence post from any direction including a direction normal to the face of the post.

And even still another object of this invention is to provide a universal angle coupling which includes a pin which is so contoured that it substantially fills an aperture in a fence post in all positions of the coupling.

Still another object of this invention is to provide a universal angle fitting for connecting two structural members together from any direction.

These and other objects and structural advantages will become more readily apparent and understood when read in connection with the accompanying figures, wherein:

Fig. 1 is a side elevation of a portion of a fence and post structure incorporating the universal angle coupling of the present invention;

Fig. 2 is a longitudinal cross-section of a post showing a side elevation of the universal angle coupling comprising this invention in an operative position in said post;

Fig. 3 is a bottom view of the universal angle coupling;

Fig. 4 is a side elevation of the universal angle coupling shown on Fig. 3;

Fig. 5 is a right end view of the universal angle coupling of Figs. 3 and 4;

Fig. 6 is a left end view of the universal angle coupling of Figs. 3 and 4; and

Fig. 7 is a cross section taken in the direction of the arrows 7—7 of Fig. 4.

Referring now to the details of the drawings, there is illustrated in Figs. 3 and 4, a universal angle coupling 10 consisting of a tapered tubular cap 18 having a conical section 20. A slightly tapered pin 22 is centrally located on conical section 20 of the universal angle coupling 10.

Pin 22 has a formed spherical surface S beginning at its juncture with conical section 20 and described by tilting a circle of slightly less diameter than pin 22 about a pivotal edge P. Pivotal edge P is located at a distance equal to the diameter of the tilting circle from the intersection of surface S and the conical section 20. This spherical surface S of pin 22 encompasses slightly more than 45 degrees of revolution and then it merges into an oval-shaped elongated end portion 24, best illustrated in Figs. 4, 5 and 7.

As shown in Figs. 4 and 6, the tubular cap 18 of the universal angle coupling 10 has a slightly tapered bore 40 and a plurality of stop bosses 34 at the inner end thereof. Internal reinforcing ribs 36 which extend to closed end 32 of the cap 18 are provided to back up the bosses 34 and absorb the thrust of a top rail or brace rail 12 assembled therein, as shown in Fig. 1.

As further detailed in Fig. 2, the pin 22 of end fitting 10 is inserted into a close-fitting circular aperture 30 provided in the tubing 14 of a post 16.

The tension provided by a typical fence, consisting of wire mesh 38 having a stretcher bar 26 located at its vertical edge, with the stretcher bar 26, in turn, being secured by clips 28 to post 16, adequately holds rail 12, fitting 10 and post 16 in mutual engagement.

Furthermore, as illustrated in Fig. 2, the fitting 10 may take any angle from perpendicular up to 45° with respect to post 16 in any direction. It will be noted that throughout this angular excursion, aperture 30 is always neatly closed by the circular surface S as it turns about pivotal edge P. Disengagement of the rail 12 from the post 16 is prevented by the inwardly protruding elongated end 24 of the universal angle coupling 10.

It is to be pointed out that pin 22 should be of sufficient length so that the elliptical portion thereof extends through the aperture 30 and engages the inside edge of the aperture so that the universal angle coupling 10 is prevented from slipping out of the aperture when the coupling engages the post 16 angularly.

In summary, the universal angle coupling 10 is utilized as a coupling or connection between the top rail or brace rail 12 or other rails located as desired, or used in connection with the post 16. The spherical surface S of the pin 22 engages in the cylindrical aperture 30 in the fence post 16 and completely fills it from any direction in which the universal angle coupling 10 extends from the rail. Thus, the spherical shape of surface S of the pin 22 is for the purpose of allowing the coupling to extend into the post 16 from any direction including a direction normal to the face of the post.

In cases where the top rail 12 is to be normal to the post, a straight pin projection would suffice.

However, in order to connect the top rail 12 to the post 16 at varying angles, the contoured surface of the pin 22 prevents the universal angle coupling 10 from slipping out of the aperture 30 and enables it to take a considerable load in any direction within the design limits of the coupling. As mentioned, the spherical portion S of contoured surface of the pin 22 fills the aperture 30 of the post in all positions and thus prevents condensation and moisture from entering the post 16.

It is to be noted that although the universal angle coupling 10 of this invention is utilized in connecting a top rail 12 to a post 16, it is not limited thereto as it can most readily be adapted for coupling any two structural members together in any direction or at any angle. Also, it is to be pointed out that any number of universal angle couplings 10 can be used for coupling any number of rails or braces to a post, such as post 16, and extending in many different directions.

Obviously many modifications and variations of the present invention are possible in light of the above teachings. It is, therefore, to be understood that within the scope of the appended claims, the invention may be practiced otherwise than as specifically described.

What is claimed is:

1. An angle coupling for use in coupling two structural members together at an angle varying from a position where said structural members are in alignment with each other to where said structural members are positioned substantially transversely to each other, comprising, a cap element having one end thereof arranged for receiving one end of one of said structural members, and a tapered pin secured to said cap element at its opposite end, said pin having a spherical shaped portion positioned intermediate its ends and spaced from said cap for engaging in and fully filling an aperture provided in the other of said structural members.

2. A universal angle coupling for use in coupling a first member at an angle to a second member, comprising, a tubular cap having one end thereof arranged for receiving one end of said first member, an intermediate section extending along the longitudinal direction of said tubular cap and closing off the opposite end thereof, and a tapered pin secured to said intermediate section and arranged centrally therewith, said conical pin having a spherical portion for engaging in an aperture provided in said second member.

3. A universal angle coupling for use in connecting a first member at an angle to a second member, comprising, a tubular cap having one end thereof open for receiving one end of said first member, an intermediate conical section extending along the longitudinal axis of said tubular cap and closing off the opposite end thereof, and a pin secured to said intermediate section and arranged centrally therewith, said pin having a spherical portion and an elliptical portion, said spherical portion being positioned between said intermediate conical section and said elliptical portion of said pin and arranged to engage in an aperture provided in said second member when the elliptical portion of said pin is passed through said aperture in said second member.

4. An arrangement as recited in claim 3, wherein said aperture is of circular shape, with the spherical portion of said pin being formed from a radius so that said spherical portion of said pin substantially fills said aperture in said post.

5. A universal angle coupling for use in connecting a first member at an angle to a second member, comprising, a tubular cap having one end thereof open for receiving one end of said first member, an intermediate conical section extending along the longitudinal axis of said tubular cap and closing off the opposite end thereof, and a pin secured to said intermediate section and arranged centrally therewith, said pin having a spherical portion and an elliptical portion, said spherical portion being positioned between said intermediate conical section and said elliptical portion of said pin and arranged to engage in an aperture provided in said second member when the elliptical portion of said pin is passed through said aperture in said second member, said elliptical portion being of sufficient length to extend through said aperture and engage the inside edge of said aperture so that said universal angle coupling is prevented from slipping out of said aperture when said universal angle coupling engages said second member angularly.

6. In combination, a fence rail having wire mesh extending therefrom, a fence post having at least one aperture provided therein, and at least one universal angle coupling for use in coupling said fence rail to said fence post, said coupling including a tubular cap for receiving one end of said fence rail, an intermediate conical section extending along the longitudinal axis of said tubular cap and closing off the opposite end thereof, and a pin secured to said intermediate section and arranged centrally therewith, said pin having a spherical portion and a smaller elliptical portion, said spherical portion being positioned between said intermediate conical portion and said elliptical portion of said pin and arranged to engage in said aperture provided in said fence post when the elliptical portion of said pin is passed through said aperture in said post, whereby said fence rail is coupled to said fence post.

7. An arrangement as recited in claim 6, wherein said aperture is of circular shape, with the spherical portion of said pin being formed from a radius so that said spherical portion of said pin substantially fills said aperture in said post.

8. A universal angle coupling for use in coupling a first member to a second member, comprising, a tubular cap having one end open for receiving an end of said first member, an intermediate conical section extending along the longitudinal direction of said tubular cap and closing off the other end of said cap, and a tapered pin having a spherical portion centrally located and secured to said intermediate section and arranged to engage in an aperture provided in said second member so as to couple said members together in any direction.

9. A universal angle coupling as recited in claim 8, and means positioned in the open end of said tubular cap for absorbing the thrust in said first member.

10. A universal angle coupling for use in coupling two structural members together, comprising an element having one end open for receiving an end of the first structural member, an intermediate section extending along the longitudinal direction of said element and closing off the other end of said element, and a tapered pin having a spherical portion centrally located and secured to said intermediate section and arranged to engage in an aperture provided in the second structural member so as to couple said members together in any direction.

References Cited in the file of this patent

UNITED STATES PATENTS

| 910,459 | Craig | Jan. 19, 1909 |
| 2,379,752 | Schultz | July 3, 1945 |
| 2,553,960 | De Swart | May 22, 1951 |

FOREIGN PATENTS

| 734,057 | Great Britain | July 20, 1955 |